(12) United States Patent
Sugimoto et al.

(10) Patent No.: US 8,915,438 B2
(45) Date of Patent: Dec. 23, 2014

(54) PRINTING CONTROL DEVICE, CONTROL METHOD FOR A PRINTING DEVICE, AND A CONTROL PROGRAM

(75) Inventors: Toshiyuki Sugimoto, Nagano-ken (JP); Tadashi Adachi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 593 days.

(21) Appl. No.: 12/495,906

(22) Filed: Jul. 1, 2009

(65) Prior Publication Data

US 2010/0001082 A1    Jan. 7, 2010

(30) Foreign Application Priority Data

Jul. 3, 2008    (JP) .................................. 2008-174748

(51) Int. Cl.
*G06K 19/00* (2006.01)
*G06K 1/12* (2006.01)
*G06F 3/12* (2006.01)

(52) U.S. Cl.
CPC *G06K 1/12* (2013.01); *G06K 1/121* (2013.01); *G06F 3/1205* (2013.01); *G06F 3/1253* (2013.01); *G06F 3/1284* (2013.01)
USPC ...... 235/462.01; 235/435; 235/439; 235/454; 235/494

(58) Field of Classification Search
USPC .................................. 235/435, 439, 451, 462
See application file for complete search history.

(56) References Cited

U.S. PATENT DOCUMENTS

| | | | | |
|---|---|---|---|---|
| 5,298,731 A * | 3/1994 | Ett | ........................... | 235/462.02 |
| 5,557,092 A * | 9/1996 | Ackley et al. | ............ | 235/462.07 |
| 5,606,628 A * | 2/1997 | Miyabe et al. | ................ | 382/183 |
| 5,979,765 A * | 11/1999 | Watanabe et al. | ........ | 235/462.25 |
| 6,279,828 B1 * | 8/2001 | Fann | ........................ | 235/462.01 |
| 7,637,436 B1 * | 12/2009 | Anderson | ..................... | 235/494 |
| 2006/0072779 A1 * | 4/2006 | Erol | .............................. | 382/100 |
| 2007/0084935 A1 * | 4/2007 | Takei et al. | ................... | 235/494 |
| 2008/0000981 A1 | 1/2008 | Niwa et al. | | |
| 2008/0123129 A1 * | 5/2008 | Haga | ........................... | 358/1.15 |

FOREIGN PATENT DOCUMENTS

| | | |
|---|---|---|
| CN | 101114344 A | 1/2008 |
| EP | 0828228 A2 | 3/1998 |
| EP | 0858027 A2 | 8/1998 |
| JP | 05-225366 | 9/1993 |
| JP | 2005-149471 | 6/2005 |
| JP | 2008-040541 | 2/2008 |

* cited by examiner

*Primary Examiner* — Matthew Mikels

(57) ABSTRACT

Differences in the output of the printed barcode caused by differences interpreting the barcode generating code of an application program are absorbed so that the barcode desired by the user can be printed. The printer driver 32 of the host computer 11 extracts the character data contained in plural blocks of input barcode generation data, combines the extracted character data to generate a character data array, and based on the generated character data array generates and outputs a single barcode generation command CMB to the printer 12.

9 Claims, 9 Drawing Sheets

PRINTING CONTROL DEVICE, CONTROL METHOD FOR A PRINTING DEVICE, AND A CONTROL PROGRAM

CROSS-REFERENCE TO RELATED APPLICATIONS

Japanese Patent application No. 2008-174748, filed Jul. 3, 2008, is hereby incorporated by reference in its entirety.

BACKGROUND

1. Field of Invention

The present invention relates to a printing control device, a control method for a printing device, and a control program, and relates more particularly to a printing control device, a control method for a printing device, and a control program for printing a barcode based on print data input from an application program.

2. Description of Related Art

Barcodes are widely used to identify goods and products for sale and other items (collectively referred to below as simply products).

The barcode is typically printed on the packaging of the product, or printed on a label that is applied to the product packaging, and can be read by an optical reading device called a barcode reader to capture information used for sales management and inventory management, for example. See, for example, Japanese Unexamined Patent Appl. Pub. JP-A-2008-040541.

A barcode printing system according to the related art is described next.

A barcode printing system typically has a printer connected to a host computer such as a personal computer or a workstation. To print a barcode the host computer sends image data for barcode printing directly to the printer, or prints through a dedication application program.

A problem with this barcode printing system of the related art is that word processors and other general purpose applications that cannot generate the image data for barcode printing cannot print a barcode.

One way to solve this problem is for application programs such as word processors to use a barcode font for barcode printing. A barcode font enables general purpose applications to handle barcodes in the same way as any other font. When a text string is passed with the font name of the barcode font to the device driver for the printer ("printer driver" below), the printer driver generates an image of the barcode instead of the text string.

More specifically, the user uses the application program to input the text string (character data such as the product number or serial number) corresponding to the one or plural barcodes to be printed, selects the barcode font corresponding to the desired barcode specification as the print font, and specifies the printing format such as the printing position and the barcode size. When the user then tells the program to print, the application program calls the printer driver and issues a print command.

This causes the printer driver to produce image data as the print data corresponding to the barcode font based on the barcode font, character data, and printing format including the print interval and size received from the application, and sends the print data to the printer.

As in the printing process described above, the printer then prints the specified barcode in the specified printing format based on the print data received from the printer driver.

When using a barcode with a variable number of digits (such as ITF (Interleaved Two of Five) or CODE128), however, the user may try to convert a text string containing plural characters (such as alphabetic letters and Arabic numerals) as a single barcode within the range that can be read by a particular barcode reader. In such cases, some application programs may split the text string to be printed into the component characters and pass the data character by character to the printer driver, and the barcode may be printed one character at a time.

For example, if the user wants to print the character data (that is, text string) "A12345" as a single barcode, the application program splits the string into the six characters A, 1, 2, 3, 4, 5, and passes the characters one by one to the printer driver. When this happens, a barcode that is completely different from the desired barcode is printed, or plural barcodes are printed overlapping, and the printed barcode cannot be read.

SUMMARY OF INVENTION

The present invention teaches barcode printing technology that can absorb differences in the output of the printed barcode caused by differences in how the application program passes a text string to the printer driver, and can thus print the barcode desired by the user.

A first aspect of the invention is a printing control device including a data array generating unit adapted to extract respective character data contained in a plurality of barcode generation data blocks and to combine the extracted character data to generate a single character data array; and a command generating unit adapted to generate a single barcode generation command for output to an external printing device based on the character data array generated by the data array generating unit.

With this aspect of the invention the data array generating unit extracts character data from a plurality of input barcode generation data blocks and combines the plural extracted characters to generate a single character data array.

As a result, the command generating unit generates a single barcode generation command that is output to an external printing device based on the character data array generated by the data array generating unit.

It is therefore possible to prevent generating character data that should be used to generate a single barcode from being split into plural barcodes, and the desired barcode can be printed as expected.

The barcode generation commands output from the command generating unit include commands that are input to an external printer to cause the printer to generate a barcode image because the printer is driven to generate barcodes as images, and commands that the command generating unit converts as barcode images and are input as image printing commands causing the printing device to print the barcode image with the printing device having only an image printing function.

In a printing control device according to another aspect of the invention the data array generating unit is adapted to search for a specific data segmentation character among the extracted character data and, if a specific data segmentation character is found, to combine the character data to immediately before the data segmentation character to generate the character data array.

This aspect of the invention can reliably generate a barcode containing the character data desired by the user because the data array generating unit combines the character data to immediately before a data segmentation character to generate the character data array when the extracted character data is a specific data segmentation character.

In a printing control device according to another aspect of the invention each barcode generation data block contains printing position control data specifying the printing position of a respective barcode; and the data array generating unit is adapted to combine the character data contained in a first barcode generation data block and a second barcode generation data block to generate the character data array, when the printing position specified by the printing position control data of the second barcode generation data is located within a specific printing area corresponding to the printing position specified by the printing position control data of the first barcode generation data block.

This aspect of the invention can easily identify the character data that should be rendered in a single barcode, and can thus generate the correct barcode.

In a printing control device according to another aspect of the invention, the data array generating unit is adapted to combine the character data of a character data array already generated from the character data extracted from two or more barcode generation data blocks, with that of a further barcode generation data block received immediately following the last one of the barcode generation data blocks from which the character data of the generated character data array were extracted, when the printing position specified by the printing position control data of the further barcode generation data block is located within a specific printing area corresponding to the printing position intended for the barcode corresponding to the generated character data array.

This aspect of the invention can easily identify the character data that should be rendered in a single barcode, and can thus generate the correct barcode.

A printing device according to another aspect of the invention has a data array generating unit adapted to extract respective character data contained in a plurality of barcode generation data blocks and to combine the extracted character data to generate a single character data array; a command generating unit adapted to generate a single barcode generation command based on the character data array generated by the data array generating unit; and a printing unit adapted to print a barcode based on the barcode generation command generated by the command generating unit.

With this aspect of the invention the data array generating unit of the printing device extracts character data from a plurality of input barcode generation data blocks and combines the plural extracted characters to generate a single character data array.

As a result, the command generating unit generates a single barcode generation command based on the character data array generated by the data array generating unit, and the printing unit prints a barcode based on the barcode generation command generated by the command generating unit.

It is therefore possible to prevent generating character data that should be used to generate a single barcode from being split into plural barcodes, and the desired barcode can be printed as expected.

Another aspect of the invention is a control method for a printing device including: a data array generating step of extracting respective character data contained in a plurality of barcode generation data blocks and combining the extracted character data to generate a single character data array; and a command generating step of generating a single barcode generation command based on the character data array generated in the data array generating step and outputting the single barcode generation command to an external printing device.

This aspect of the invention can prevent generating character data that should be used to generate a single barcode from being split into plural barcodes, and can print the desired barcode as expected.

A control method for a printing device according to another aspect of the invention preferably also has a printing step of printing a barcode based on the barcode generation command generated in the command generating step.

This aspect of the invention can prevent generating character data that should be used to generate a single barcode from being split into plural barcodes, and can print the desired barcode as expected.

Another aspect of the invention is a computer readable medium containing a control program for controlling a printing control device from a computer, the control program causing the computer to execute: a data array generating function of extracting respective character data contained in a plurality of barcode generation data blocks and combining the extracted character data to generate a single character data array; and a command generating function of generating a single barcode generation command based on the character data array generated in the data array generating function and outputting the single barcode generation command to an external printing device.

With this aspect of the invention the printing control device can prevent generating character data that should be used to generate a single barcode from being split into plural barcodes, and can print the desired barcode as expected.

The control program according to another aspect of the invention preferably also has a printing function that causes printing a barcode based on the barcode generation command generated by the command generating function.

With this aspect of the invention the printing control device can prevent generating character data that should be used to generate a single barcode from being split into plural barcodes, and can print the desired barcode as expected.

The invention thus enables printing a barcode that can be reliably read by a barcode reader in the format desired by the user without increasing the burden on the user.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of the present invention is described below with reference to the accompanying figures.

Figure 1:
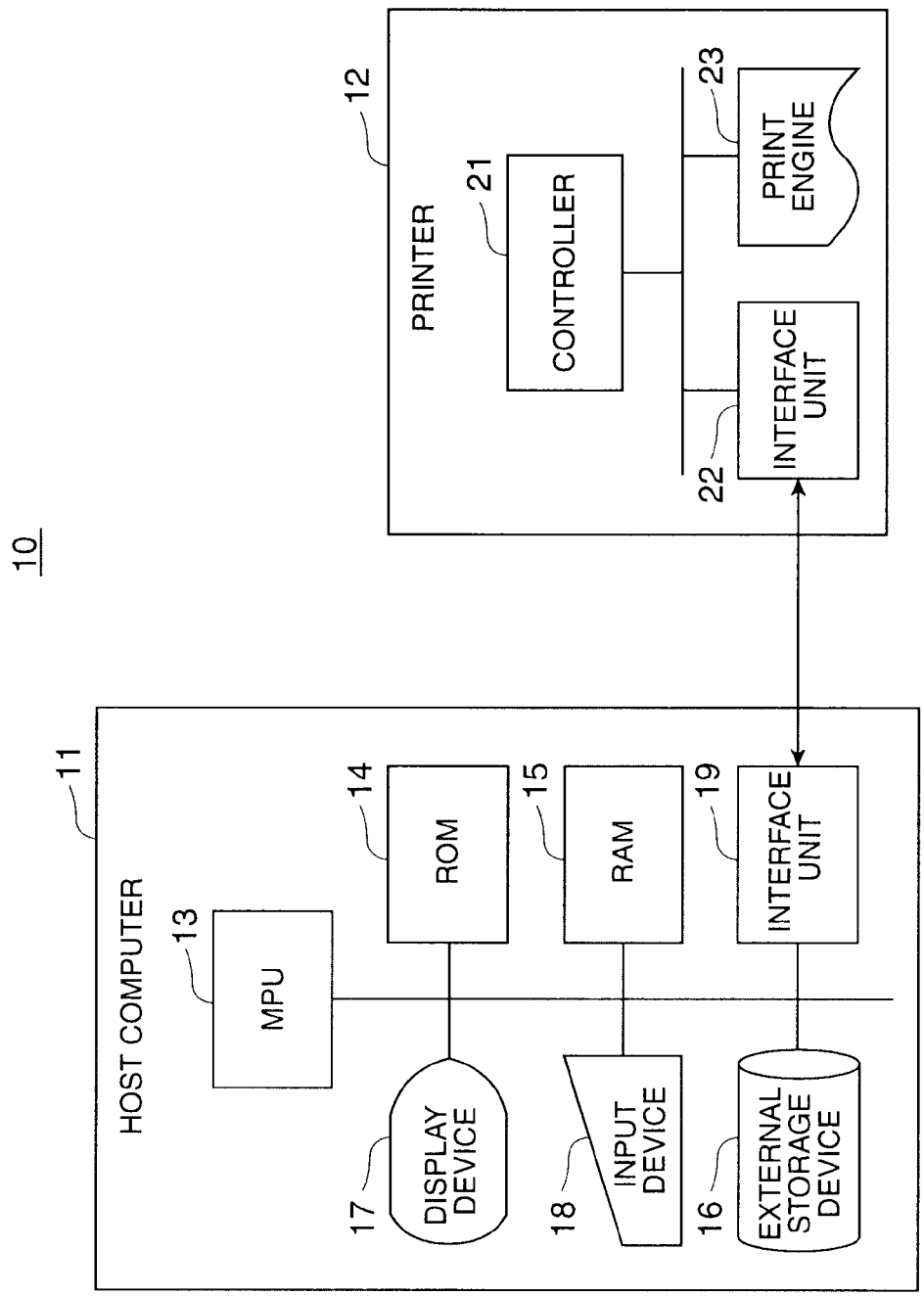
FIG. 1 is a block diagram showing the configuration of a barcode printing system according to a preferred embodiment of the invention.

FIG. 1 is a block diagram schematically describing the configuration of a barcode printing system according to a preferred embodiment of the invention.

This barcode printing system 10 includes a host computer 11 (printing control device) and a printer 12 (printing device) that prints barcodes as controlled by the host computer 11.

The host computer 11 includes an MPU 13 that controls the host computer 11, ROM 14 that stores a control program, RAM 15 that functions as working memory for temporarily storing data, an external storage device 16 such as a hard disk drive, a display device 17 such as an LCD for displaying information, an input unit 18 including input devices such as a keyboard and mouse, and an interface unit 19 such as a parallel printer interface or a serial printer interface for interfacing with an external device.

The printer 12 has an MPU, ROM, and RAM not shown, a controller 21 that controls the printer 12, an interface unit 22 for interfacing with an external device, and a print engine 23 that handles the actual printing as controlled by the controller 21.

An example of the data format of the barcode generating data contained in the print data that is output from the application program to the printer driver is described next.

Figure 2:
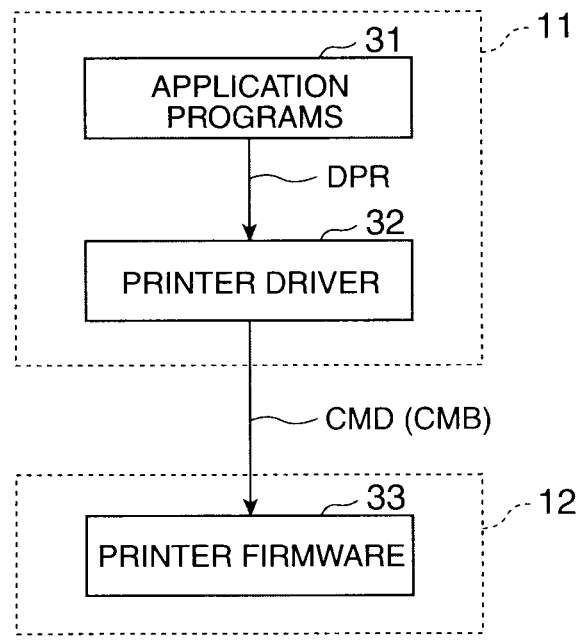
FIG. 2 is a block diagram showing the software structure of the barcode printing system.

FIG. 2 shows the software configuration of the barcode printing system.

One or more application programs 31 such as word processors and inventory management systems run on the host computer 11, and these application programs 31 output print data DPR for printing information including barcodes to the printer driver 32.

The printer driver 32 then interprets the print data DPR, generates a print command CMD containing barcode generation command CMB, and sends the print command CMD to printer firmware 33 that operates on the printer 12.

As a result, the printer firmware 33 prints a barcode based on the input print command CMD, and therefore based on the barcode generation command CMB.

Figure 3:
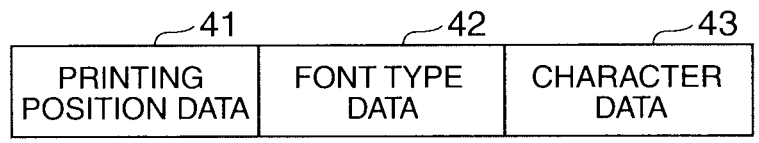
FIG. 3 shows the data for generating a barcode.

FIG. 3 schematically shows the structure of the data for generating a barcode ("barcode generation data" below).

Note that while a linear barcode is used by way of example of a barcode in the following description, the invention is not so limited and can be applied to 2D barcodes such as stacked barcodes and data matrix barcodes.

The barcode generation data 40 includes printing position data 41 that specifies the barcode printing position, font type data 42 that specifies the font type of the generated barcode, and character data 43 containing the barcode content.

The printing position data 41 stores location coordinates relative to a reference position (such as relative to the top left corner (X=0, Y=0) of the printing area on the recording paper).

The font type data 42 stores information about the type of font data used to generate the barcode, such as a font type code specifying the JAN, Code 39, NW-7, or other font type. The font type data 42 may also include information such as the print size.

The character data 43 describes the content to be printed as a barcode, and may include a country code (data), manufacturer code (data), product item code (data), and other desired text data.

The process executed by the printer driver 32 is described next.

Figure 4:
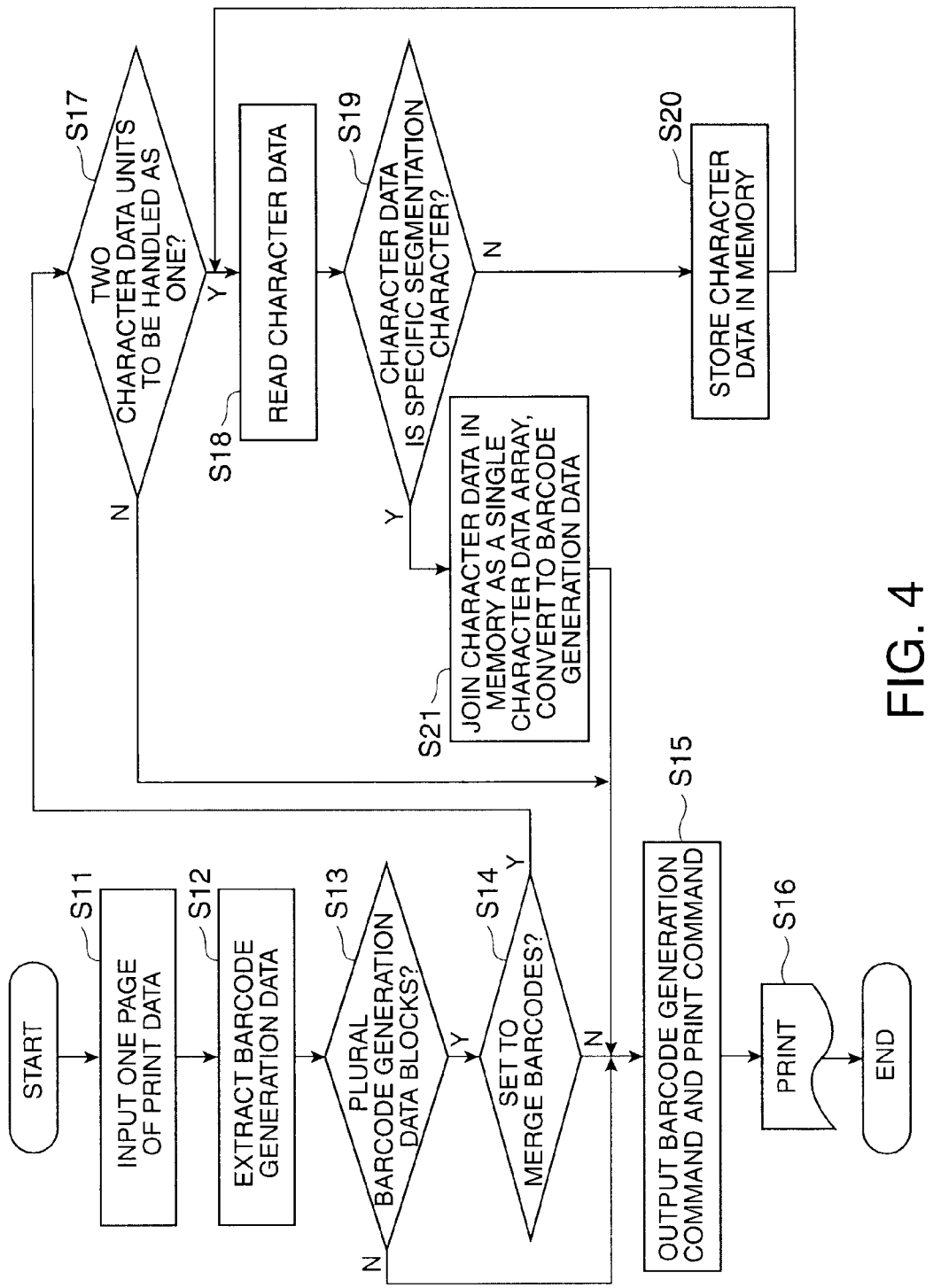
FIG. 4 is a flow chart of the process executed by the printer driver.

FIG. 4 is a flow chart of the printer driver process.

When one page of print data DPR is input from the application program 31 (step S11), the printer driver 32 extracts the barcode generation data 40 contained in the input page of print data DPR (step S12).

The printer driver 32 then determines if a plurality of barcode generation data 40 blocks were received (step S13).

If step S13 determines that a plurality of barcode generation data 40 blocks were not received, that is, only one barcode generation data 40 block was received (step S13 returns No), a barcode generation command CMB is generated based on the barcode generation data 40 and output to the printer 12 with other print commands (step S15). In this case an image printing command (including bitmap data as the image data, for example) for printing an image of the barcode generated by the printer driver 32 is output to the printer 12 as the barcode generation command CMB. If the barcode image is generated on the printer 12 side, only a command not including image data is sent to the printer.

The printer thus prints the barcode at the specified position based on the input print command CMD containing the barcode generation command CMB, and prints one page (step S16).

If step S13 determines that a plurality of barcode generation data 40 blocks were received (step S13 returns Yes), the printer driver 32 determines if the plural barcode generation data 40 blocks are to be merged (step S14). If plural barcode generation data 40 blocks are set to be merged, the character data 43 contained in the input plural barcode generation data 40 blocks are combined to create a single character data array so that the resulting string can be handled as though a single barcode generation data 40 block containing character data equal to the generated character data string had been input. This accommodates situations in which character data that should be handled as a single data block by the application program is split by the application program into a plurality of character data units and input as data for generating a plurality of barcodes.

If step S14 determines that merging the plural barcode generation data 40 blocks is not set (step S14 returns No), the printer driver 32 generates a plurality of barcode generation commands CMB based on the plural barcode generation data 40 blocks, and outputs the barcode generation commands CMB with another print command CMD to the printer firmware 33 of the printer 12 (step S15).

The printer firmware 33 of the printer 12 then prints the barcodes at the specified positions based on the input print command CMD containing plural barcode generation commands CMB, and prints one page (step S16).

If step S14 determines that merging the plural barcode generation data 40 blocks is set (step S14 returns Yes), the printer driver 32 reads the printing position data 41 for two barcode generation data 40 blocks in the order received to determine if the plural barcode generation data 40 blocks are to be combined, and determines if the character data contained in the two barcode generation data 40 blocks is character data that should be handled as a single character data block (step S17).

Based on the printing position data 41 contained in the barcode generation data 40, it is determined that the character data should be handled as a single character data block if any of the following conditions are satisfied:

(1) if the printing position of the barcode corresponding to the input barcode generation data being evaluated is within the specified printing range based on the printing position of the barcode corresponding to the barcode generation data input immediately before said input barcode generation data;

(2) if the barcode generation command was generated based on the character data string being generated and the barcode was then printed, the printing position of the barcode corresponding to the input barcode generation data being evaluated would be within the printing area of the printed barcode; or (3) if the distance between the printing position of the barcode corresponding to the input barcode generation data being evaluated, and the printing position of the barcode corresponding to the barcode generation data input immediately before said input barcode generation data, is less than a specific setting, and the character data corresponding to the input barcode generation data is not a specific segmentation character.

More specifically, if when the barcodes are printed as separate barcodes the printing areas of the barcodes overlap or the barcodes are in extreme proximity to each other, it is determined that the character data should be handled as a single block.

If step S17 determines that the character data contained in the two barcode generation data 40 blocks is not character data that should be handled as a single block of characters (step S17 returns No), the printer driver 32 goes to step S15, generates the barcode generation command CMB based on only the barcode generation data 40 input just before the input barcode generation data, or based on treating the character data 43 contained in the barcode generation data 40 input until just before the input barcode generation data as the character data 43, and outputs the barcode generation command CMB with another print command to the printer firmware 33 of the printer 12 (step S15). Based on the print command CMD containing the input barcode generation command CMB, the printer firmware 33 of the printer 12 prints the barcode at the specified position and prints one page (step S16).

However, if step S17 determines that the character data contained in the two barcode generation data 40 blocks is character data that should be handled as a single block of characters (step S17 returns Yes), the MPU 13 reads the character data 43 contained in the input barcode generation data 40 being evaluated (step S18).

Next, the MPU 13 determines if the read character data 43 is a specific segmentation character (data) (step S19). This segmentation character (data) is a character (data) inserted by the user to unconditionally divide the character data 43 of the plural consecutively input barcode generation data 40 blocks into a plurality of character data arrays, and is a character code causing the input data to be split into separate barcodes before and after the segmentation character. This segmentation character is thus contained in the last barcode generation data 40 of the barcode generation data 40 block containing the last character data 43 in one barcode, or the barcode generation data 40 immediately before the barcode generation data 40 block containing the first character data 43 in one barcode.

If step S19 determines that the read character data 43 is not the specific segmentation character (data) (step S19 returns No), the MPU 13 stores the read character data 43 temporarily in RAM 15 to compile the character data string (step S20), and then returns to step S18.

However, if step S19 determines that the read character data 43 is the specific segmentation character (data) (step S19 returns Yes), the MPU 13 links the character data 43 already stored in the RAM 15 into a single character data string, generates a barcode generation command using the compiled character data string as the character data 43 (step S21), and outputs the barcode generation command with another print command to the printer 12 (step S15). Based on the input print command CMD, the printer firmware 33 of the printer 12 prints the barcode at the specified position and prints one page (step S16).

As described above, when merging barcodes is set, this embodiment of the invention reads the character data 43 contained in plural barcode generation data 40 blocks as a single string of character data, generates a barcode generation command CMB using this character data string as the new character data 43, and outputs a print command CMD containing the barcode generation command CMB to the printer 12. As a result, the printer driver 32 can absorb differences between the actual printer output and the barcode that is desired by the user resulting from the character data being unnecessarily segmented by the application program, and barcodes can be easily printed as desired by the user. A specific example is described next.

Figure 5A:
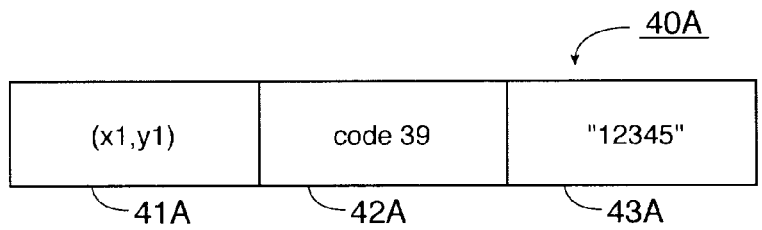
FIGS. 5A and 5B show examples of the barcode generating data input from the application programs.
Figure 5B:
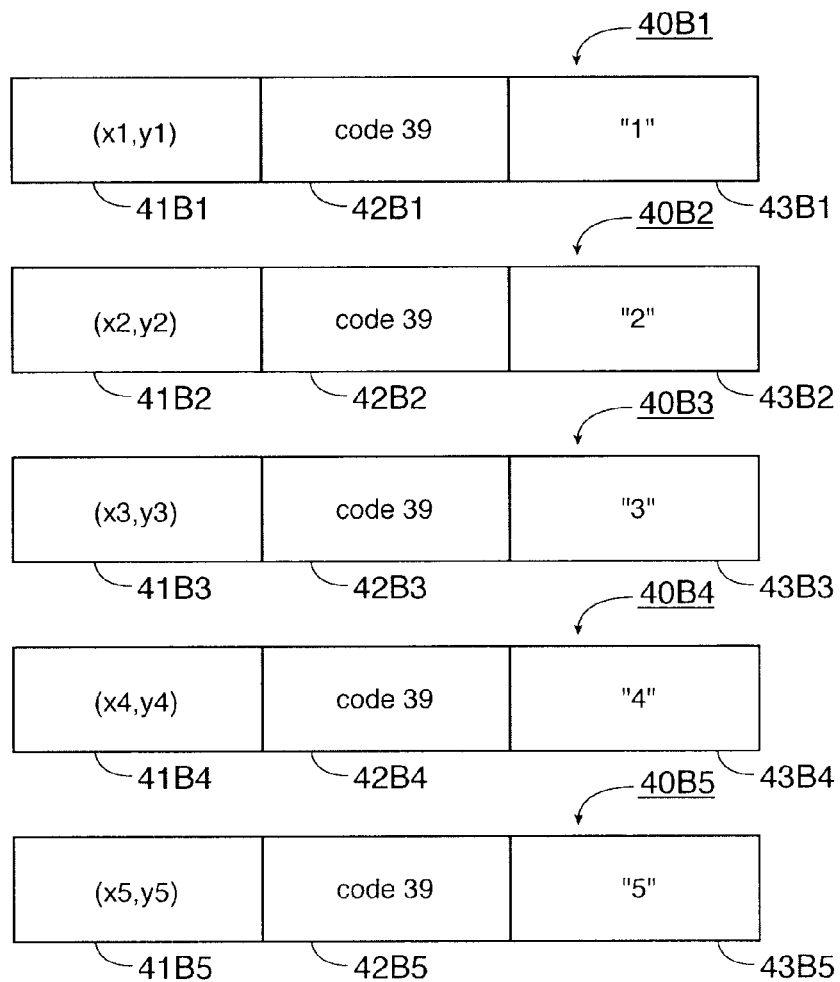

FIGS. 5A and 5B show examples of barcode generation data input from the application programs.

Figure 6A:
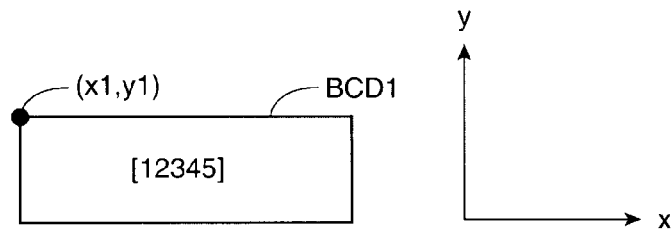
FIGS. 6A, 6B, and 6C show the operation of the printer driver corresponding to FIGS. 5A and 5B.
Figure 6B:
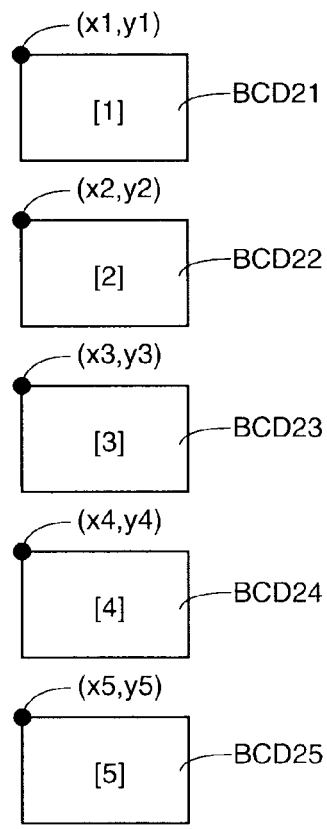
Figure 6C:
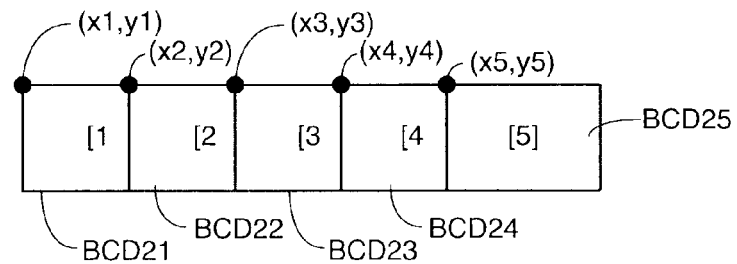

FIGS. 6A, 6B, and 6C show the operation of the printer driver using the input data shown in FIGS. 5A and 5B.

FIG. 5A shows an example of the barcode generation data 40A output from one application program. The barcode generation data 40A includes printing position data 41A=(x1, y1), font type data 42A="Code 39", and character data 43A="12345".

As a result, as shown in FIG. 6A, a barcode BCD1 containing "12345" as the character data is printed in the specified format (the Code 39 format in this embodiment of the invention) at a position where the coordinates of the top left corner of the printing area of a barcode including a margin part and a symbol part are (x1,y1).

FIG. 5B shows an example of the barcode generation data output from another application program. The printer driver is set to merge plural barcode generation data 40 blocks for this type of application program, and in this example five barcode generation data 40B1-40B5 blocks are input to the printer driver 32 as the barcode generation data.

More specifically, barcode generation data 40B1 contains printing position data 41B1=(x1,y1), font type data 42B1="Code 39", and character data 43B1="1". Barcode generation data 40B2 contains printing position data 41B2=(x2,y2), font type data 42B2="Code 39", and character data 43B2="2". Barcode generation data 40B3 contains printing position data 41B3=(x3,y3), font type data 42B3="Code 39", and character data 43B3="3". Barcode generation data 40B4 contains printing position data 41B4=(x4,y4), font type data 42B4="Code 39", and character data 43B4="4". Barcode generation data 40B5 contains printing position data 41B5=(x5,y5), font type data 42B5="Code 39", and character data 43B5="5".

As a result, as shown in FIG. 6B, barcodes BCD21 to BCD25 respectively representing "1", "2", "3", "4", "5" are printed to positions where the coordinates of the top left corners of the printing areas of the barcodes containing a margin part and symbol part are (x1,y1), (x2,y2), (x3,y3), (x4,y4), and (x4,y4), and the printed barcodes differ from the desired output shown in FIG. 6A.

In addition, because barcode generation data 40B1 to 40B5 is originally the data for a single barcode, y1=y2=y3=y4=y5, the five barcodes BCD21 to BCD25 are printed partially overlapping by the method of the related art as shown in FIG. 6C, and the complete barcode cannot be read.

However, when five barcode generation data blocks 40B1 to 40B5 are input as shown in FIG. 5B, the sequence of steps S17 to S22 described above reads the character data 43B1 to 43B5 from the five barcode generation data blocks 40B1 to 40B5, that is, reads the numbers "1" to "5", combines them into the single character data string="12345", gates a barcode generation command CMB using the generated character data string as the new character data character data 43, and outputs a print command CMD containing the barcode generation command CMB to the printer 12. As a result, a single barcode BCD1 containing "12345" as the character data can be printed as desired by the user and shown in FIG. 6A.

Figure 7A:
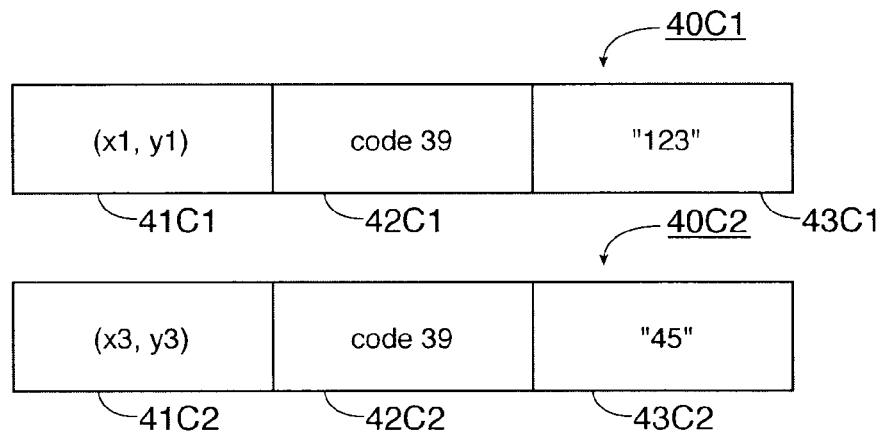
FIGS. 7A and 7B show another example of the barcode generating data input from the application programs.
Figure 7B:
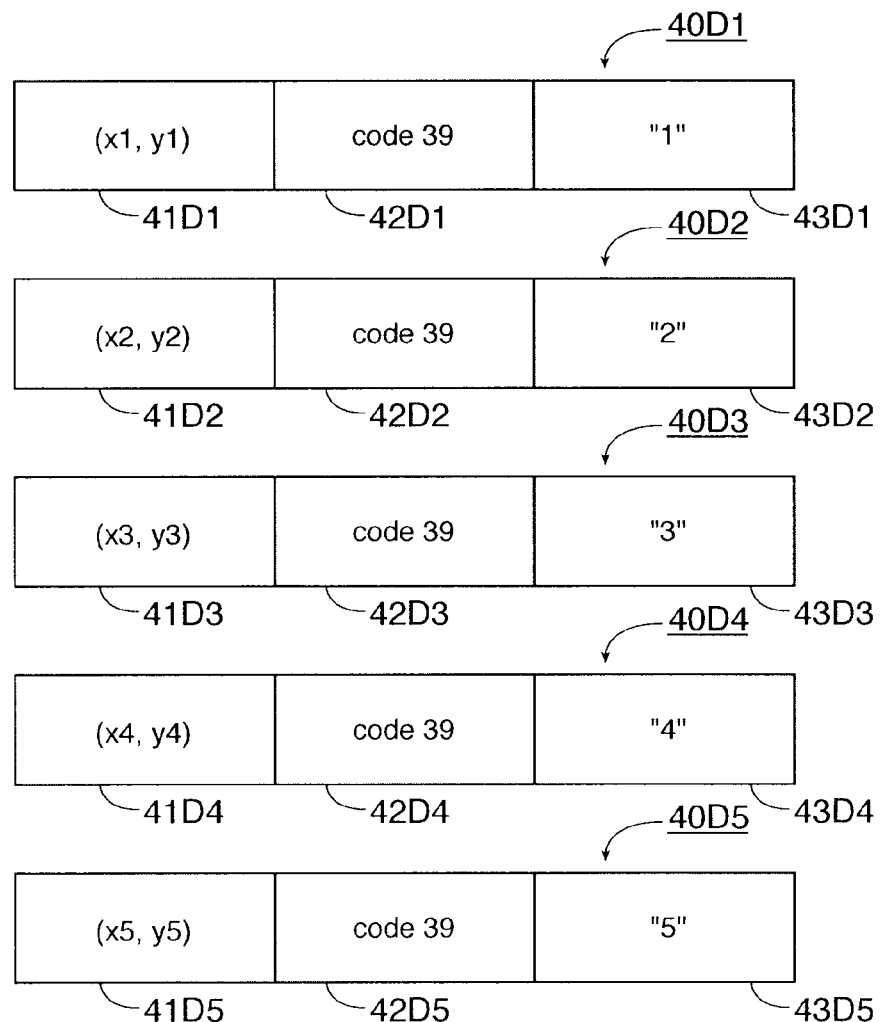
Figure 8A:
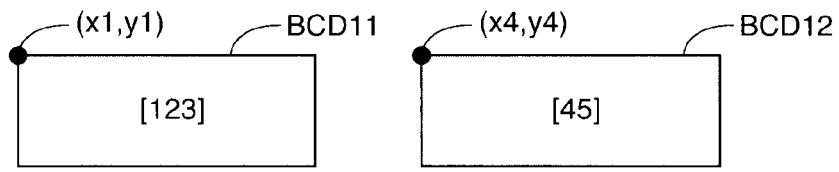
FIGS. 8A, 8B, and 8C show the operation of the printer driver corresponding to FIGS. 7A and 7B.
Figure 8B:
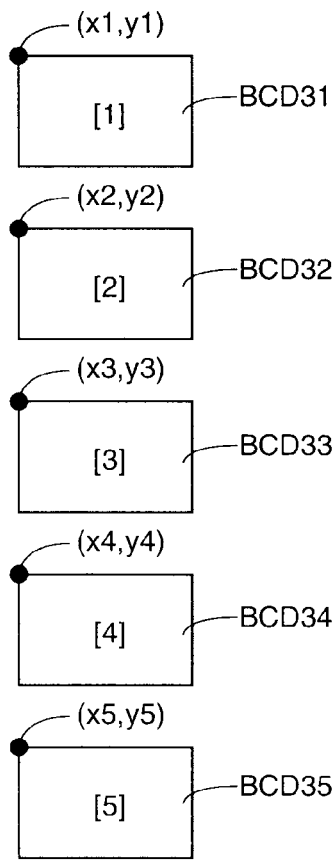
Figure 8C:
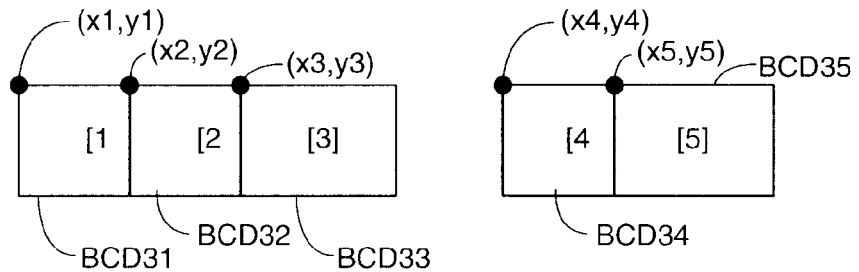

FIGS. 7A and 7B show other examples of the barcode generation data input from an application programs. FIGS. 8A, 8B, and 8C show the operation of the printer driver using the input data shown in FIGS. 7A and 7B.

In this example as shown in FIG. 7A two barcode generation data blocks are input from one application program, specifically barcode generation data 40C1 and 40C2. Barcode generation data 40C1 contains printing position data 41C1=(x1,y1), font type data 42C1="Code 39", and character data 43C1="123". Barcode generation data 40C2 contains printing position data 41C2=(x3,y3), font type data 42C2="Code 39", and character data 43C2="45".

As a result, as shown in FIG. 8A, a barcode BCD11 containing "123" as the character data is printed at a position where the coordinates of the top left corner of the printing area of a barcode including a margin part and a symbol part are (x1,y1), and a barcode BCD11 containing "45" as the character data is printed at a position where the coordinates of the top left corner of the printing area of a barcode including a margin part and a symbol part are (x3,y3).

FIG. 7B shows an example of the barcode generation data output from another application program. The printer driver is set to merge plural barcode generation data 40 blocks for this type of application program, and in this example five barcode generation data 40D1-40D5 blocks are input to the printer driver 32 as the barcode generation data.

More specifically, barcode generation data 40D1 contains printing position data 41D1=(x1,y1), font type data 42D1="Code 39", and character data 43D1="1". Barcode generation data 40D2 contains printing position data 41D2=(x2,y2), font type data 42D2="Code 39", and character data 43D2="2". Barcode generation data 40D3 contains printing position data 41D3=(x3,y3), font type data 42D3="Code 39", and character data 43D3="3". Barcode generation data 40D4 contains printing position data 41D4=(x4,y4), font type data 42D4="Code 39", and character data 43D4="4". Barcode generation data 40D5 contains position data 41D5=(x5,y5), font type data 42D5="Code 39", and character data 43D5="5".

As a result, as shown in FIG. 8B, barcode BCD31 to barcode BCD35 respectively representing "1", "2", "3", "4", "5" are printed to positions where the coordinates of the top left corners of the printing areas of the barcodes containing a margin part and symbol part are (x1,y1), (x2,y2), (x3,y3), (x4,y4), and (x5,y5), and the printed barcodes differ from the desired output shown in FIG. 7A.

Furthermore, because barcode generation data 40D1 to 40D5 are data for a barcode to be printed at the same height position (that is, the same position on the y-axis), y1=y2=y3=y4=y5. If printed by the method of the related art, the three barcodes BCD31 to BCD33 will be printed partially overlapping and the two barcodes BCD34 and BCD35 will be printed partially overlapping at a position separated from these three barcodes BCD31 to BCD33 as shown in FIG. 8C, and none of the barcodes BCD31 to BCD35 will be readable.

With this embodiment of the invention, however, if the five barcode generation data 40D1 to 40D5 are input as shown in FIG. 7B and either (1) the barcode printing position for the input barcode generation data to be evaluated is located within a specific printing area based on the barcode printing position for the barcode generation data input directly before said input barcode generation data, or (2) if a barcode generation command is generated based on character data string being generated and the corresponding barcode is printed, the barcode printing position for the input barcode generation data being evaluated would be within the printing area of the printed barcode, then the sequence of steps S17 to S22 first read the character data 43D1 to 43D3, that is, "1" to "3", from the three barcode generation data blocks 40D1 to 40D3, compile the character data string "123", and generate a barcode generation command CMB using the compiled character data string as new character data 43. Then the character data 43D4, 43D5, that is, "4" and "5", is read from the next two barcode generation data blocks 40D4 and 40D5, compiled as the single character data string "45", and a barcode generation command CMB is generated using the single character data string as the new character data 43. A print command CMD containing the barcode generation command CMB is then output to the printer 12, and two barcodes BCD11 and BCD12 representing the character data "123" and "45" can be printed as desired by the user and shown in FIG. 8A.

Figure 9:
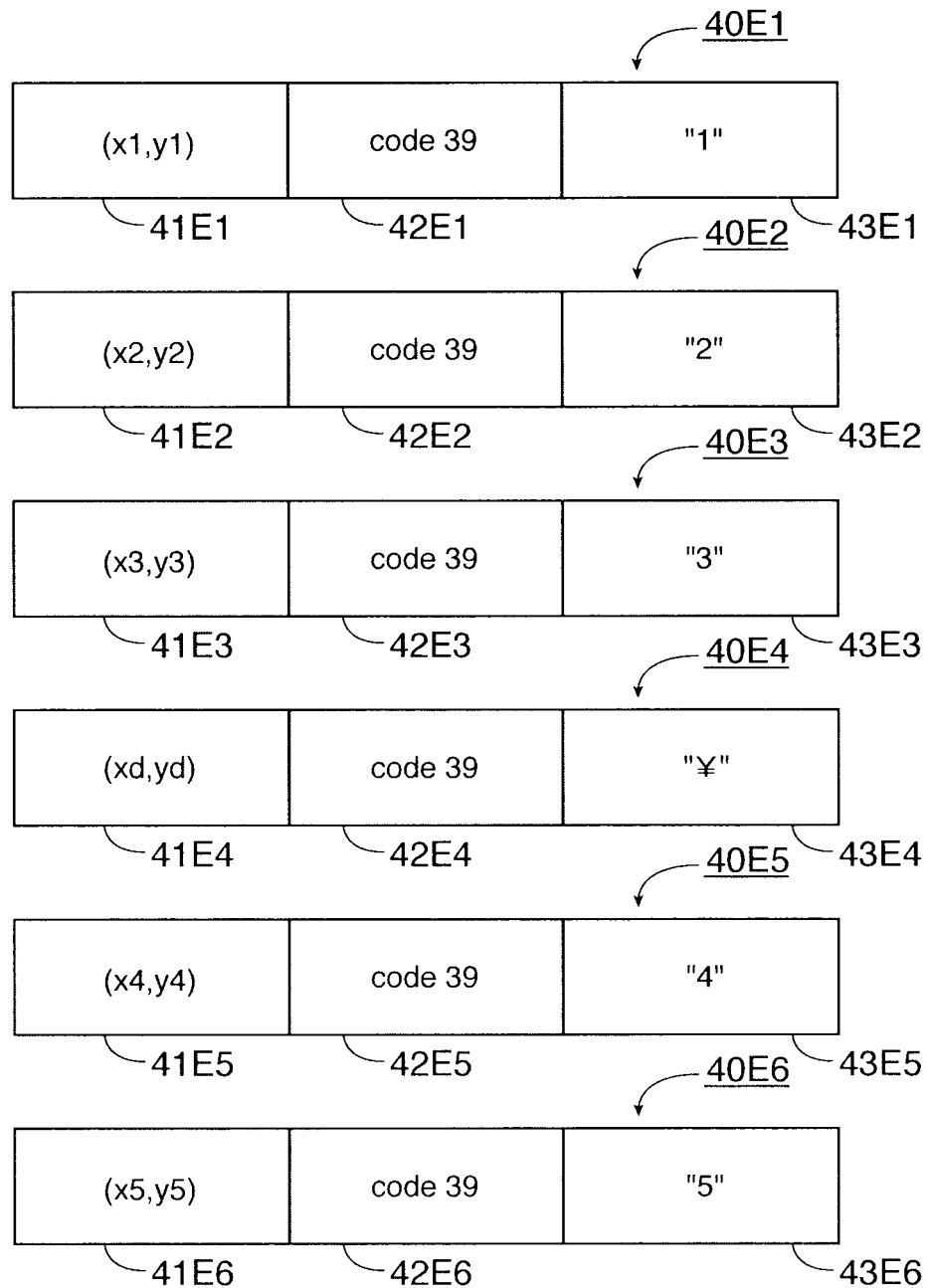
FIG. 9 shows yet another example of the barcode generating data input from the application program.
Figure 10A:
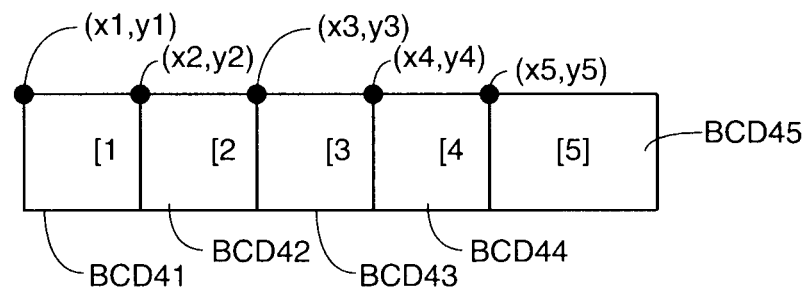
FIGS. 10A and 10B show the operation of the printer driver corresponding to FIG. 9.
Figure 10B:
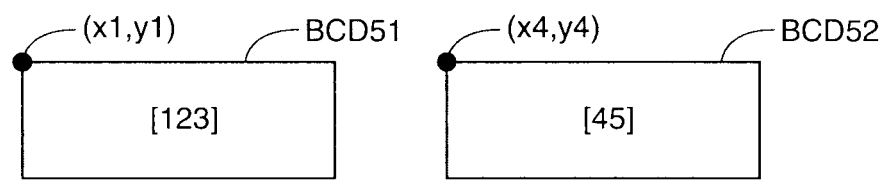

FIG. 9 shows yet another example of barcode generation data input from an application program. In this example the character data includes a segmentation character (data). FIGS. 10A and 10B show the operation of the printer driver using the input data shown in FIG. 9.

FIG. 9 shows an example of the barcode generation data output from an application program, plural blocks of barcode generation data are set to be merged for this type of application program, and six barcode generation data 40E1 to 40E6 including barcode generation data for a segmentation character as the barcode generation data are input to the printer driver 32.

More specifically, barcode generation data 40E1 contains printing position data 41E1=(x1,y1), font type data 42E1="Code 39", and character data 43E1="1". Barcode generation data 40E2 contains printing position data 41E2=(x2,y2), font type data 42E2="Code 39", and character data 43E2="2". Barcode generation data 40E3 contains printing position data 41E3=(x3,y3), font type data 42E3="Code 39", and character data 43E3="3". Barcode generation data 40E4 contains dummy data (xd,yd) as the printing position data 41E4, font type data 42E4="Code 39", and the segmentation character "¥" (yen symbol) as the character data 43E4. Barcode generation data 40E5 contains printing position data 41E5=(x4,y4), font type data 42E5="Code 39", and character data 43E5="4". Barcode generation data 40E6 contains printing position data 41E6=(x5,y5), font type data 42E6="Code 39", and character data 43E6="5".

Note that the yen symbol (¥) is used as the segmentation character in this example, but any character or character string that is not a character or character string reserved as a control code may be used as the segmentation character.

As a result, barcode BCD41 to barcode BCD45 respectively containing "1", "2", "3", "4", "5" as the character data are printed to positions where the coordinates of the top left corners of the printing areas of the barcodes containing a margin part and symbol part are (x1,y1), (x2,y2), (x3,y3), (x4,y4), and (x5,y5).

However, because barcode generation data 40E1 to 40E3 and 40E5 to 40E6 are data for barcodes to be printed at the same height position (that is, the same position on the y-axis), y1=y2=y3=y4=y5. Because the method of the related art does not transmit barcode generation data corresponding to the segmentation character, the five barcodes BCD41 to BCD45 will be printed partially overlapping as shown in FIG. 10A even if the data is sent without this segmentation character, and none of the barcodes BCD41 to BCD45 will be readable. In addition, if the data is sent containing barcode generation data for the segmentation character, six barcodes containing "1", "2", "3", "Y", "4", "5" as the character data will be printed partially overlapping, and an extraneous barcode corresponding to the segmentation character will printed in addition to none of the barcodes being readable.

However, when the five blocks of barcode generation data 40E1 to 40E3, 40E5, 40E6 are input as shown in FIG. 9 in this embodiment of the invention, the distance between the barcode printing position of the input barcode generation data to be printed and the barcode printing position of the barcode generation data input directly before said input barcode generation data is shorter than the specific setting, and the character data in the input barcode generation data is recognized as the specific segmentation character.

The sequence of steps S17 to S22 then first read the character data 43E1 to 43E3, that is, "1" to "3", from the three barcode generation data blocks 40E1 to 40E3, compile the single character data string "123", and generate a barcode generation command CMB using the compiled character data string as new character data 43. Then, skipping the barcode generation data containing the segmentation character, the character data 43E5 and 43E6, that is, "4" and "5", is read from the two barcode generation data blocks 40E5 and 40E6, compiled as a single character data string="45", and a barcode generation command CMB is generated using the single character data string as the new character data 43. A print command CMD containing the barcode generation command CMB is then output to the printer 12, and two barcodes BCD51 and BCD52 representing the character data "123" and "45" can be printed as desired by the user and shown in FIG. 10B.

As described above, this embodiment of the invention enables printing barcodes in the format desired by the user from a variety of different application programs by presetting whether barcodes are to be merged according to the behavior of the program.

In the embodiment described above the printer driver generates commands, but the printer driver may function to only pass data from the application program to the printer, and the printer firmware may execute the function of the printer driver described above. More specifically, a data array generating function that extracts character data contained in a plurality of barcode generation data blocks and combines the extracted plural character data to generate a single character data array, and a command generating function that generates a single barcode generation command based on the character data array generated by the data array generating function, can be achieved, and barcodes can be printed based on the barcode generation command generated by the command generating function using the normal printing function.

Because changing the printer driver is not necessary with this aspect of the invention, the invention can be easily used with a wide range of host computers.

The present invention may be embodied on a computer-readable medium containing instructions (i.e. control program) that, when executed by a computer or processing unit(s), control a printing control device to perform the method(s) of the present invention. The media may be specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code, instructions or control program include machine code, such as produced by a compiler, and files containing higher level code that are executed by a computer using an interpreter.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printing control device comprising:
a data array generating unit that extracts respective character data contained in a plurality of barcode generation data blocks, determines when two barcode generation data blocks are to be combined, and combines the extracted character data to generate a single character data array when the two barcode generation data blocks are to be combined; and
a command generating unit that generates a single barcode generation command for output to an external printing device based on the single character data array generated by the data array generating unit when the two barcode generation data blocks are to be combined, and generates a plurality of barcode generation commands for output to an external printing device when the two barcode generation data blocks are not to be combined;
wherein each barcode generation data block contains printing position control data specifying the printing position of a respective barcode; and
the data array generating unit determines that the two barcode generation data blocks are to be combined and merges the character data contained in a first barcode generation data block and a second barcode generation data block to generate the single character data array and generates a single barcode printing position for the merged character data of the character data array, only when the printing position specified by the printing position control data of the second barcode generation data is located within a specific printing area corresponding to the printing position specified by the printing position control data of the first barcode generation data block.

2. The printing control device described in claim 1, wherein:
the data array generating unit searches for a specific data segmentation character among the extracted character data and, when a specific data segmentation character is found, combines the extracted character data that is immediately before the data segmentation character to generate the single character data array.

3. The printing control device described in claim 1, wherein:
the data array generating unit combines the character data of the single character data array already generated from the character data extracted from the two barcode generation data blocks with character data of a third barcode generation data block received immediately following the last one of the two barcode generation data blocks from which the character data of the generated single character data array were extracted, only when the printing position specified by the printing position control data of the third barcode generation data block is located within a specific printing area corresponding to the printing position intended for the barcode corresponding to the generated single character data array.

4. A control method for a printing device comprising:

a data array generating step of extracting respective character data contained in a plurality of barcode generation data blocks, determining when two barcode generation data blocks are to be combined, and combining the extracted character data to generate a single character data array; and a command generating step of generating a single barcode generation command based on the single character data array generated in the data array generating step and outputting the single barcode generation command to an external printing device when the two barcode generation data blocks are to be combined, and generating a plurality of barcode generation commands for output to an external printing device when the two barcode generation data blocks are not to be combined;

wherein each barcode generation data block contains printing position control data for specifying the printing position of a respective barcode; and the data array generating step determines that the two barcode generation data blocks are to be combined and merges the character data contained in a first barcode generation data block and a second barcode generation data block to generate the single character data array and generates a single barcode printing position for the merged character data of the character data array, only when the printing position specified by the printing position control data of the second barcode generation data block is located within a specific printing area corresponding to the printing position specified by the printing position control data of the first barcode generation data block.

5. The control method for a printing device described in claim 4, further comprising:

a printing step of printing a barcode based on the single barcode generation command or the plurality of barcode generation commands generated in the command generating step.

6. The control method for a printing device described in claim 4, wherein:

the data array generating step comprises searching for a specific data segmentation character among the extracted character data and, when a specific data segmentation character is found, combining the extracted character data that is immediately before the data segmentation character to generate the single character data array.

7. The control method for a printing device described in claim 4, wherein:

the data array generating step combines the character data of the single character data array already generated from the character data extracted from the two barcode generation data blocks with character data of a third barcode generation data block received immediately following the last one of the two barcode generation data blocks from which the character data of the generated single character data array were extracted, only when the printing position specified by the printing position control data of the third barcode generation data block is located within a specific printing area corresponding to the printing position intended for the barcode corresponding to the generated single character data array.

8. A non-transitory computer readable medium containing a control program for controlling a printing control device from a computer, the control program causing the computer to execute:

a data array generating function of extracting respective character data contained in a plurality of barcode generation data blocks, determining when two barcode generation data blocks are to be combined, and combining the extracted character data to generate a single character data array; and a command generating function of generating a single barcode generation command based on the single character data array generated in the data array generating function and outputting the single barcode generation command to an external printing device when the two barcode generation data blocks are to be combined, and generating a plurality of barcode generation commands for output to an external printing device when the two barcode generation data blocks are not to be combined;

wherein each barcode generation data block contains printing position control data for specifying the printing position of a respective barcode; and the data array generating function determines that the two barcode generation data blocks are to be combined and merges the character data contained in a first barcode generation data block and a second barcode generation data block to generate the single character data array and generates a single barcode printing position for the merged character data of the character data array, only when the printing position specified by the printing position control data of the second barcode generation data block is located within a specific printing area corresponding to the printing position specified by the printing position control data of the first barcode generation data block.

9. The computer readable medium described in claim 8, wherein the control program further comprises:

a printing function that causes printing a barcode based on the single barcode generation command or the plurality of barcode generation commands generated in the command generating function.

* * * * *